US012771713B2

(12) United States Patent
Chawla et al.

(10) Patent No.: US 12,771,713 B2
(45) Date of Patent: Oct. 20, 2026

(54) ADAPTIVE MULTI-DIMENSIONAL ANOMALY DETECTION

(71) Applicant: Microsoft Technology Licensing, LLC, Redmond, WA (US)

(72) Inventors: Varun Chawla, Sammamish, WA (US); Karthik Uthaman, Seattle, WA (US); Ashok Nandoori, Frisco, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 18/657,731

(22) Filed: May 7, 2024

(65) Prior Publication Data

US 2025/0350629 A1 Nov. 13, 2025

(51) Int. Cl.
*H04L 9/40* (2022.01)
*H04L 43/062* (2022.01)
*H04L 43/0882* (2022.01)

(52) U.S. Cl.
CPC ........ *H04L 63/1458* (2013.01); *H04L 43/062* (2013.01); *H04L 43/0882* (2013.01); *H04L 63/1425* (2013.01)

(58) Field of Classification Search
CPC ............... H04L 63/1458; H04L 43/062; H04L 43/0882; H04L 63/1425
See application file for complete search history.

(56) References Cited

U.S. PATENT DOCUMENTS

| | | | | |
|---|---|---|---|---|
| 10,516,695 | B1 * | 12/2019 | Evans | H04L 63/1425 |
| 2012/0246726 | A1 * | 9/2012 | Kind | H04L 63/1416 726/23 |
| 2018/0255095 | A1 * | 9/2018 | Doron | H04L 63/0209 |
| 2020/0274902 | A1 * | 8/2020 | Gopal | H04L 63/0209 |
| 2022/0141239 | A1 * | 5/2022 | Zaman | G06F 21/71 726/23 |
| 2024/0031380 | A1 | 1/2024 | Lal | |
| 2024/0259421 | A1 * | 8/2024 | Sharma | H04L 63/1458 |
| 2025/0030709 | A1 * | 1/2025 | Tian | H04L 63/1416 |

FOREIGN PATENT DOCUMENTS

| | | |
|---|---|---|
| CN | 112351012 A | 2/2021 |
| CN | 115842667 A | 3/2023 |

OTHER PUBLICATIONS

Extended European search report received in European Application No. 25171363.2, mailed on Jul. 9, 2025, 10 pages.

(Continued)

*Primary Examiner* — Anh Nguyen
(74) *Attorney, Agent, or Firm* — Workman Nydegger

(57) ABSTRACT

Adaptive multi-dimensional anomaly detection is provided. System load metrics of a computing device are monitored. Multi-dimensional analysis of traffic data from a plurality of traffic sources is performed with security modules of an anomaly detector on the computing device. A traffic source is identified from the plurality of traffic sources based on the multi-dimensional analysis of traffic data from the plurality of traffic sources and associated historical traffic data. An action is performed on the traffic data from the identified traffic source, while the traffic data from the plurality of traffic sources other than the identified traffic source is allowed unaffected.

20 Claims, 10 Drawing Sheets

(56) References Cited

OTHER PUBLICATIONS

Cheng, et al., "Adaptive DDoS attack detection method based on multiple-kernel learning", accessed on URL: https://arxiv.org/abs/1905.07893, May 20, 2019, 22 pages.
Gluckd, et al., "Microsoft denial-of-service defense strategy", Microsoft, Mar. 3, 2023, 3 pages.
Hawawreh, et al., "An anomaly-based approach for DDOS attack detection in cloud environment", accessed on URL: https://www.researchgate.net/publication/326388197, vol. 57, No. 4, 2018, pp. 312-324.
Machaka, et al., "Using Exponentially Weighted Moving Average Algorithm to Defend Against DDoS Attacks", IEEE, Pattern Recognition Association of South Africa and Robotics and Mechatronics International Conference, 2016, 16 pages.

* cited by examiner

500

Algorithm 1 Modular Anomaly Detection System

```
Objects:
PlatformProtector: Aggregates scores and decides actions.
ProtectionModules: Each module tracks different dimension of TrafficData,
implements AnomalyDetector.
AnomalyDetector: Trait defining anomaly_score method.
LoadSignals: Monitors variety of load signals both at system and proxy
level.
Initialization:
Configure PlatformProtector with thresholds and weights for module scores.
procedure PlatformProtectorOperation
    procedure RequestHook
        Collect TrafficData for each incoming request/connection.
        Initialize an empty list ModuleScores.
        for each module in ProtectionModules do
            score ← module.anomaly_score(TrafficData)
            Append score to ModuleScores.
        end for
        Action ← Allow
        aggregatedScore ← aggregated_anomaly_score(moduleScores)
        systemLoad ← LoadSignals.get_load().
        if systemLoad exceeds loadThreshold then
            adaptiveThreshold ← adjust threshold(systemLoad).
            if aggregatedScore exceeds adaptiveThreshold then
                Action ← Block
            end if
        end if
        Log action for analysis and auditing.
        Return Action
    end procedure
end procedure
```

FIG. 5

600

```
// Structure to hold statistics for each tenant.
// This includes multiple metrics to provide a multi-dimensional view of the tenant's traffic.
struct TenantStats {
    tenant_id: TenantId,                // Unique identifier for the tenant.
    rps: EWMARate<f64>,                 // Rate of requests per second, smoothed using EWMA.
    topn_ips: TopTalker<IP, u64>,       // Top N IP addresses based on some metric (e.g., number of requests).
    rps_from_ip: CountMinSketch<String>, // Estimation of RPS from each IP, useful for identifying most active IPs.
    unique_ips: HyperLogLog,            // Estimation of the number of unique IPs interacting with the tenant.
    active_connections: u32,            // Number of active connections for the tenant.
}

// Structure to track and analyze tenant-level statistics.
struct TenantTracker {
    // Data structure to hold top N tenants based on specific metrics.
    top_n_tenants: TopTalkers<String, TenantStats>,
}

// Trait defining the functionality for anomaly detection.
pub trait AnomalyDetector {
    // Function to calculate an anomaly score for a given request or connection.
    fn anomaly_score(&self, request: &Request) -> f64;
}
```

FIG. 6

700

```
// Structure to hold statistics for each IP address.
// This includes multiple metrics to provide a multi-dimensional view of the IP's traffic.
struct IPStats {
    ip: IP,                             // Unique identifier for the IP address.
    rps: EWMARate<f64>,                 // Rate of requests per second, smoothed using EWMA.
    bps: EWMARate<f64>,                 // Rate of bytes per second, smoothed using EWMA.
    tenant: CountMinSketch<String>,     // Estimation of interaction frequency with different tenants.
    unique_tenants: HyperLogLog,        // Estimation of the number of unique tenants interacted with.
    active_connections: u32,            // Number of active connections for the IP.
}

// Structure to track and analyze IP-level statistics.
struct IPTracker {
    top_n_ips: TopTalkers<IP, IPStats>,  // Data structure to hold top N IPs based on specific metrics.
}
```

FIG. 7

800

```
// Structure to hold statistics for each connection.
// This includes multiple metrics to provide a detailed view of the connection's traffic and behavior.
struct ConnStats {
    fd: FileDescriptor,         // Unique identifier for the connection (file descriptor).
    ip: IP,                     // IP address associated with the connection.
    tenant: TenantId,           // Tenant associated with the connection.
    bytes: u64,                 // Total bytes transferred in the connection.
    duration: Duration,         // Duration of the connection.
    rps: EWMARate<f64>,         // Rate of requests per second, smoothed using EWMA.
    bps: EWMARate<f64>,         // Rate of bytes per second, smoothed using EWMA.
    protocol: Protocol,         // Network protocol used by the connection.
}

// Structure to track and analyze connection-level statistics.
struct ConnectionTracker {
    active_connections: HashMap<FileDescriptor, ConnStats>,  // Map of active connections and their statistics.
    top_n_conns_by_bytes: TopTalkers<FileDescriptor, &ConnStats>, // Top N connections based on bytes transferred.
}
```

FIG. 8

900

```
#[derive(Serialize, Deserialize, Debug)]
struct RateLimitOverrides {
    ClientIPs: HashMap<IP, RateLimitOverrideByIP>,
    IPClass: HashMap<IPClass, RateLimitOverrideByClass>,
}

#[derive(Serialize, Deserialize, Debug)]
struct PlatformProtectionConfig {
    method: String,
    load_signals_thresholds: LoadSignalThresholds,
    rate_limit_overrides: RateLimitOverrides,
    Tenant: HashMap<String, TenantRateLimitOverride>,
}

trait ConfigManager {
    fn parse_config(data: &[u8]) -> Result<(), ConfigError>
    fn get_latest_version() -> Result<u64, ConfigError>
}

impl PlatformProtectionConfig {
    fn get_tenant_override(tenant_id: &str) -> Result<TenantRateLimitOverride, Error>
    fn get_ip_override(tenant_id: &str) -> Result<RateLimitOverrideByIP, Error>
    fn get_ip_class_override(tenant_id: &str) -> Result<RateLimitOverrideByIPClass, Error>
}
```

FIG. 9

ADAPTIVE MULTI-DIMENSIONAL ANOMALY DETECTION

BACKGROUND

Computing systems and services in a network environment are always under threat from malicious attackers. The attackers may launch a distributed denial-of-service (DDOS) attack to disrupt normal traffic of a targeted server, service, or network by flooding them with malicious requests. A cloud service provider providing services to multiple tenants is more vulnerable due to likely disruption of their services to all tenants even if one of the tenants is under DDOS attack. Existing solutions analyze single dimensional traffic data (e.g., requests per second (RPS)) and rely on static rules to detect anomalies in traffic. Such existing solutions are inaccurate and unreliable to safeguard against DDOS attacks in distributed network environments.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for an adaptive multi-dimensional anomaly detection is described. System load metrics of a computing device are monitored. Multi-dimensional analysis of traffic data from a plurality of traffic sources is performed using security modules of an anomaly detector on the computing device. A traffic source is identified from the plurality of traffic sources based on the multi-dimensional analysis of traffic data from the plurality of traffic sources and associated historical traffic data. An action is performed on the traffic data from the identified traffic source without performing the action on the traffic data from the plurality of traffic sources other than the identified traffic source.

BRIEF DESCRIPTION OF THE DRAWINGS

The present description will be better understood from the following detailed description read considering the accompanying drawings, wherein:

FIG. 5 is an example algorithm providing adaptive multi-dimensional anomaly detection.

FIG. 6 is an example TenantStats data structure for anomaly detection using multi-dimensional traffic analysis at the tenant level.

FIG. 7 is an example IPStats data structure used by IPTracker security module.

FIG. 8 is an example ConnStats data structure used by Connection Tracker security module.

FIG. 9 is an example of a ConfigManager data structure used to configure the parameters for anomaly detection.

Corresponding reference characters indicate corresponding parts throughout the drawings. In FIGS. 1 to 10, the systems are illustrated as schematic drawings. The drawings may not be to scale. Any of the figures may be combined into a single example or embodiment.

DETAILED DESCRIPTION

Figure 1:
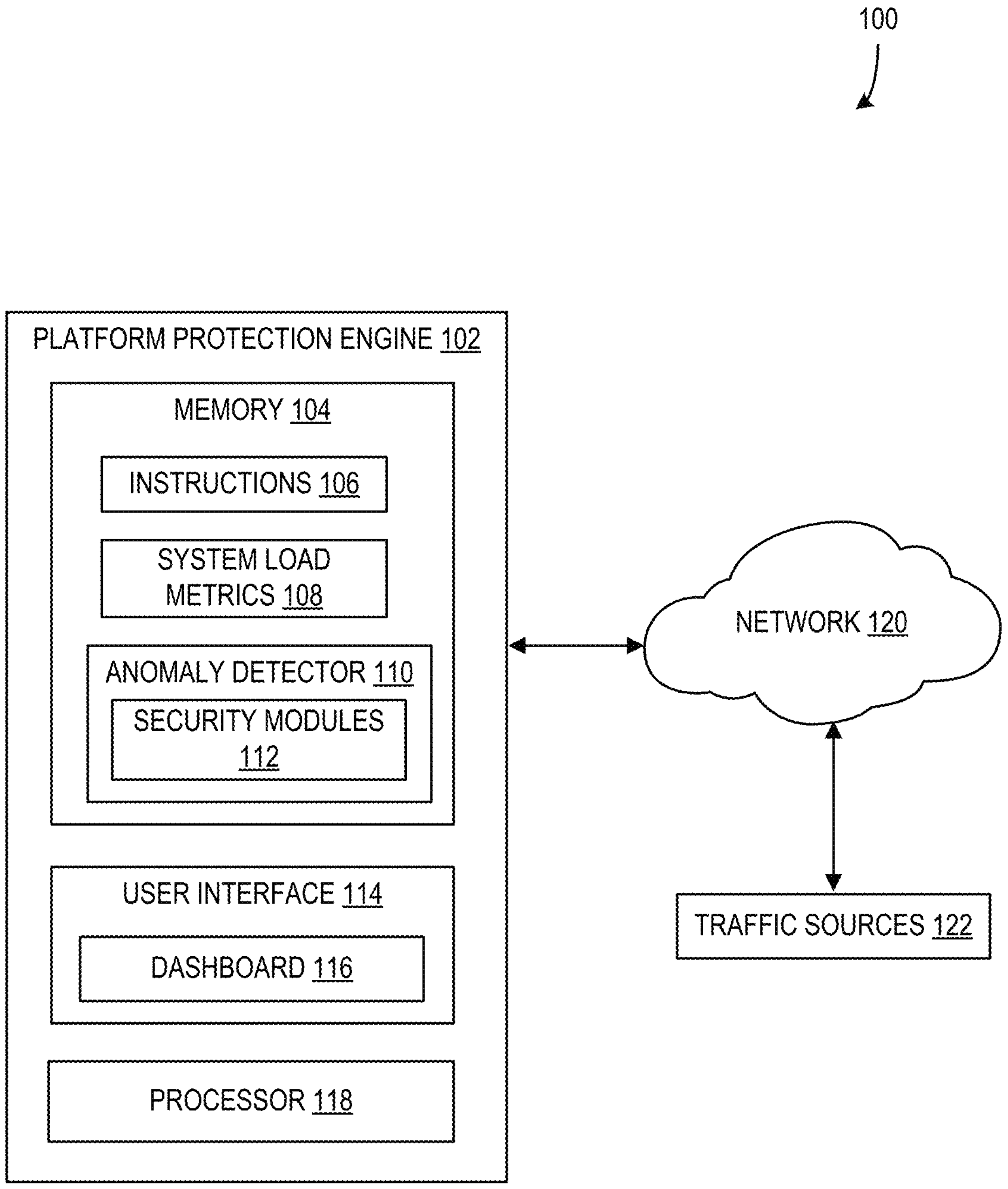
FIG. 1 illustrates a block diagram of an example system for an adaptive multi-dimensional anomaly detection for DDOS defense.

A common way for an attacker to create a distributed denial-of-service (DDOS) attack is to target a proxy or the content delivery networks (CDNs) serving the customers. The attackers try to bypass the protection of the CDN to overwhelm the origin, or try to inflict enough damage that the origin being attacked is no longer accessible. In a conventional system, this triggers the protection that the CDN has built-in, so that the service becomes unavailable for everyone.

Further, conventional solutions rely on single-dimensional analysis. For example, a conventional solution may analyze how much traffic a customer or a single internet protocol (IP) address is sending, and match this with a static threshold (e.g., 100 requests per second). As soon as any customer hits this static threshold, the conventional solution is not able to differentiate if the traffic is coming from a legitimate customer or a bad actor. The proxy and/or the CDN throttles such customers without any distinction between a legitimate customer or a bad actor.

In contrast, aspects of the disclosure provide systems and methods for adaptive multi-dimensional anomaly detection for DDOS defense in complex network environments. Examples of the disclosure specifically protect the customer that is under the DDOS attack without disrupting other customers on the same platform (e.g., underlying computing resources).

In some examples, system load metrics (e.g., central processing unit (CPU), memory, network, and disk) of a computing device are monitored. Multi-dimensional analysis of traffic data from a plurality of traffic sources is performed using a plurality of security modules of an anomaly detector on the computing device. The plurality of security modules (e.g., a tenant tracker, an IP tracker, and a connection tracker) operate as a distinct entity, meticulously tracking and analyzing a specific spectrum of traffic metrics. This compartmentalization allows each module to specialize in its domain, developing deep insights and tailored anomaly detection mechanisms that are finely attuned to the nuances of its respective data set.

Examples of performing the multi-dimensional analysis of traffic data comprise analyzing the traffic data from each of the plurality of traffic sources on a range of metrics across different entities and on interrelationships among the range of metrics across different entities. A traffic source is identified from the plurality of traffic sources based on the multi-dimensional analysis of traffic data from the plurality of traffic sources and associated historical traffic data. An action is performed on the traffic data from the identified traffic source and the traffic data from the plurality of traffic sources other than the identified traffic source is allowed.

Unlike conventional systems that often rely on static rules or simplistic monitoring, this multifaceted approach transcends traditional traffic analysis at least by acknowledging and analyzing the interconnected nature of network entities such as tenants, IP addresses, and connections. The platform protection engine is able to discern subtle, multi-dimensional patterns. For instance, while a singular metric like requests per second (RPS) from an individual IP might not signal an anomaly, examples of the disclosure synthesize this metric in the context of related tenants or connections to identify otherwise obscure anomalous patterns. In this way, examples of the disclosure not only significantly enhance the accuracy of anomaly detection but also ensure a fine-tuned response, carefully balancing the mitigation of malicious traffic with the uninterrupted flow of legitimate traffic. The multi-dimensional anomaly detection and real-time response mechanisms in examples of the disclosure ensure unparalleled system uptime and security. This approach not only bolsters the resilience and reliability of individual systems, but also extends its protective umbrella to secure the entire tenant ecosystem.

In some examples, the traffic source is identified from the plurality of traffic sources based on the multi-dimensional analysis of traffic data using an adaptive anomaly scoring methodology. An anomaly score is generated from each of the plurality of security modules. An aggregate anomaly score is determined by applying weights to the anomaly scores from the plurality of security modules. The weights are adaptively determined based on the system load metrics. For example, if the CPU is close to exhaustion, the weights to be applied to anomaly scores from the tenant tracker and the IP tracker are increased. Similarly, if memory is close to exhaustion, weight to be applied to the anomaly score from the connection tracker may be increased. For example, an RPS of 1000 is likely to cause load on the memory which may result in connections getting dropped. In this example, more weight is adaptively applied to anomaly score determined by the connection tracker compared to weights applied to the anomaly scores determined by the other security modules (e.g., tenant tracker, IP tracker, etc.).

The aggregate anomaly score is compared with a threshold. If the aggregate anomaly score is determined to exceed the threshold based on comparison, the traffic source (e.g., contributing most to the aggregate anomaly score) is identified from the plurality of traffic sources. An action is performed on the traffic data from the identified traffic source and the traffic data from the plurality of traffic sources other than the identified traffic source is allowed. Otherwise, if the aggregate anomaly score does not exceed the threshold, traffic data from the plurality of traffic sources is allowed (e.g., without any specific action to block or control the traffic data).

In some examples, even if the system 100 is not under stress but the anomaly score (e.g., between 90 to 100) indicates strong likelihood of anomaly, the platform protection engine 102 does not allow traffic from such traffic sources.

Example advantages of the disclosure, particularly when compared to traditional anomaly detection and DDOS defense solutions, include a modular architecture, multi-dimensional data analysis, and adaptive anomaly scoring mechanisms. By performing the action on the traffic data from the identified traffic source, examples of the disclosure advantageously protect the resources (e.g., CPU, network, disk, memory) of the system 100 from getting overwhelmed by the attackers irrespective of attack pattern used.

FIG. 1 is a block diagram illustrating a system 100 for providing an adaptive multi-dimensional anomaly detection for DDOS defense. A platform protection engine 102 (e.g., implemented on a computing apparatus 1018 in FIG. 10), comprising a user interface 114, a processor 118, and a memory 104, receives traffic data from a plurality of traffic sources 122 via a network 120. The memory 104 stores instructions 106 that upon execution by the processor 118 perform operations described in FIGS. 3-4.

System load metrics 108 of the platform protection engine 102 are monitored. Multi-dimensional analysis of traffic data from a plurality of traffic sources 122 is performed using a plurality of security modules 112 of an anomaly detector 110 on the platform protection engine 102. The plurality of security modules 112 comprises two or more of a tenant tracker, an internet protocol (IP) address tracker, a connection tracker, and the like. Any number of security modules may be plugged into the platform protection engine 102. For example, there is a security module specifically for large language model (LLM) traffic, a security model specifically for gaming traffic (e.g., high performance remote procedure call (gRPC) traffic), etc. Each module employs its own anomaly scoring mechanism, translating complex, multi-dimensional data into a normalized, comprehensible score. By focusing on a specific set of metrics, the security modules 112 detect anomalies with a high degree of sensitivity and precision because they can account for the unique context and behavior patterns inherent to their data scope, something that a conventional one-size-fits-all model might miss.

The platform protection engine 102 integrates the individual anomaly scores from each module, weaving them into a comprehensive, multi-faceted anomaly profile for each request or connection from the different traffic sources 122. This profile encapsulates the multi-dimensional nature of network traffic, offering a holistic view of potential threats. The platform protection engine 102 adapts its detection strategy based on the nature and scale of the traffic, the prevailing network conditions, or emerging threat patterns. The integration of multiple, module-specific anomaly scores allows the platform protection engine 102 to make informed, precise decisions. By considering a spectrum of indicators and their interrelations, the system accurately differentiates between benign anomalies and genuine threats, minimizing false positives and ensuring that legitimate traffic flows unhindered.

In some examples, for each request/connection event, all the security modules 112 compute the anomaly scores which are then combined into a weighted score. If the platform protection engine 102 detects the system is overloaded, the weighted score is used to determine whether to allow the request/connection. The platform protection engine 102 adapts to the load of the system by adjusting the anomaly score threshold. When the system is not overloaded, platform protection engine 102 logs its decisions and allows the request.

A traffic source is identified from the plurality of traffic sources 122 based on the multi-dimensional analysis of traffic data from the plurality of traffic sources 122 and associated historical traffic data. For example, an anomaly score is generated from each of the plurality of security modules 112. An aggregate anomaly score is determined by applying weights to the anomaly scores from the plurality of security modules. The weights are adaptively determined based on the plurality of system load metrics. The aggregate anomaly score is compared with a threshold. If the aggregate anomaly score is determined to exceed the threshold based on comparison, the traffic source (e.g., contributing most to the aggregate anomaly score and/or based on historical traffic data) is identified from the plurality of traffic sources. For example, a good traffic source or a bad traffic source is inferred based on previous attack patterns or previous anomalous activity patterns. In some examples, some traffic sources may be classified as home IP addresses and traffic from such traffic sources may be allowed to pass through.

An action is selectively performed on the traffic data from the identified traffic source and the traffic data from the plurality of traffic sources 122 other than the identified traffic source is allowed. The actions taken on traffic data from the different traffic sources are presented in a dashboard 116 of a user interface 114. While the dashboard 116 and user interface 114 are shown on the platform protection engine 102, aspects of the disclosure may present the dashboard 116 and the user interface 116 on a user computing device (e.g., a client device) different from the platform protection engine 102 (not shown).

Figure 2:
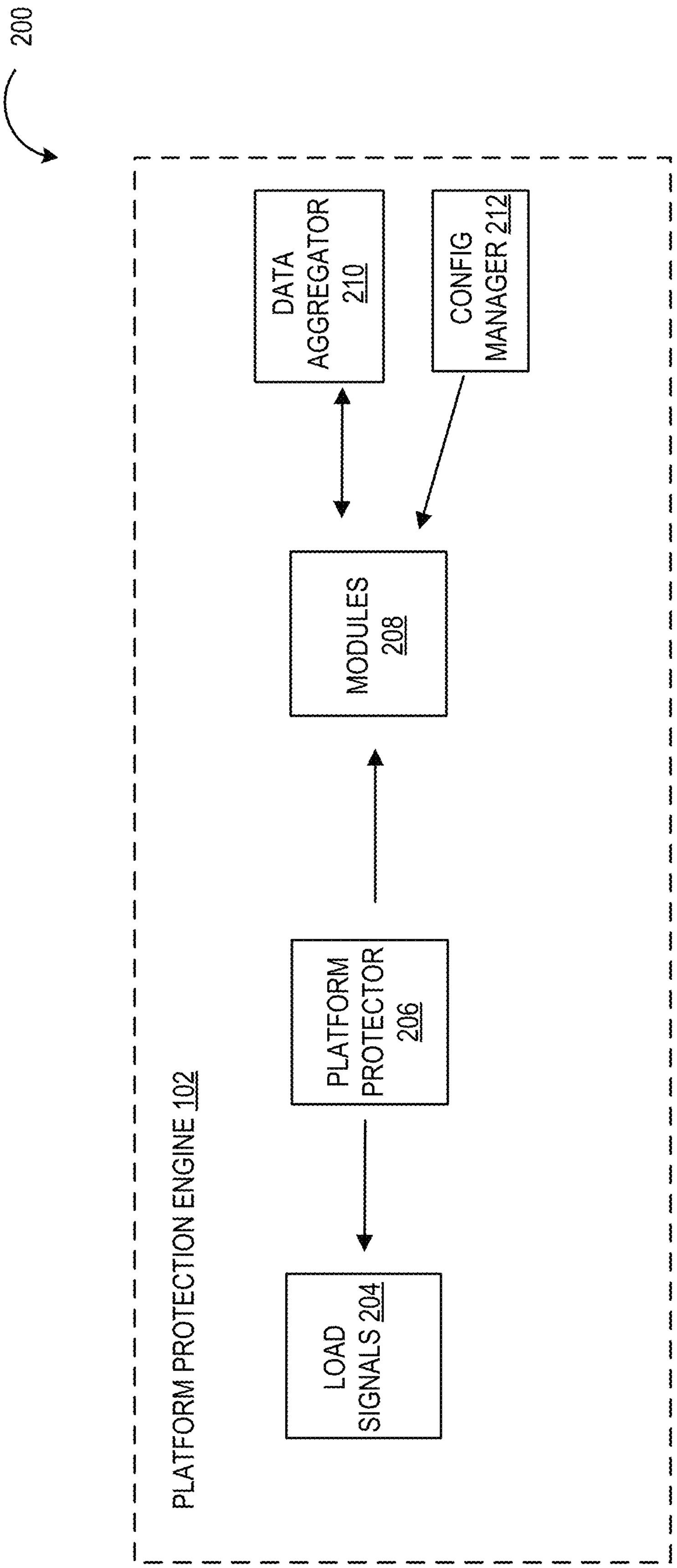
FIG. 2 illustrates a block diagram of an example platform protection engine for providing adaptive multi-dimensional anomaly detection.

FIG. 2 is a block diagram 200 of an example platform protection engine 102 for DDOS defense. The platform protection engine 102 monitors the health of a computing system by analyzing the load signals 204 of the system. The load signals 204 identify how heavily loaded are the resources (such as CPU, memory, disk, network, etc.) of the computing system and proxy load metrics (such as a proxy's CPU, memory utilization, event load, thread load, etc.). The load signals 204 may act as trigger to initiate anomaly detection. For example, if the load signals 204 identify that the system is healthy, the platform protection engine 102 saves resources (e.g., computing, memory, and network resources) that would have been required for anomaly detection and lets the traffic pass through without even initiating anomaly detection.

Platform protector 206 manages the workflow, oversees inter-module communication, and maintains a shared context (e.g., a reservoir of global data and operational statistics) essential to threat assessment procedures by the modules (e.g., the security modules 208). Platform protector 206 exposes various hook points that will be used or registered to the core layer of the platform protection engine 102. The platform protector 206 monitors the traffic and requests for the anomaly scores from the security modules 208 perspective. Each module 208 can track their own data independently and each module 208 reports the anomaly detection in a normalized way through anomaly scores in the range of 0-100, where higher score indicates higher anomaly of the given request. Some exemplary modules 208 are tenant tracker, IP tracker, and connection tracker. The modular architecture of the platform protection engine 102 ensures that more or fewer modules 208 may be included without deviating from the disclosure.

For example, a first module tracks the anomaly score based on RPS, a second module tracks the anomaly score based on bandwidth consumption (e.g., bytes per second (BPS)), and a third module tracks the anomaly score based on connection profile (e.g., how long they have held the connection, how many bytes they have sent through that connection etc.).

The platform protector 206 combines the anomaly scores from the modules 208 to create an aggregated anomaly score and uses historic patterns to identify the anomalous traffic source. For example, if the aggregated anomaly score is 75 and historic patterns of past 7 days indicate anomaly score ranging from 40-50, this indicates malicious activity and the request (i.e., current traffic) from this traffic source is identified as anomalous. The modules 208 track the data that it needs in a common data store via the data aggregator 210. This data in the common data store is used by the modules 208 for analyzing future traffic data from the same traffic source. In an example, the platform protection engine 102 tracks the top 1000 IP addresses that are accessing a given customer. A first security module (e.g., tenant tracker module) may be called which updates its data structure and tracks the top N IP addresses. Tracking the top N IP addresses may be performed in any way. Some examples use TopTalker, a binary heap-based data structure designed to keep track of the top N contributors in a particular category such as the top IP addresses generating the most traffic. In such examples, TopTalker is used to maintain a real-time list of the most active IPs or tenants, helping to quickly identify sources that dominate the traffic and may be part of an anomalous pattern. However, aspects of the disclosure are operable with data structures and systems other than TopTalker. The modules 208 may be configured via configuration manager 212 that provides a user interface to configure the parameters of the modules 208.

For normally distributed data, Z-Score analysis can be used to detect outliers. Data points that have a Z-Score beyond a certain threshold (e.g., 3 standard deviations from the mean) can be considered anomalies. Z-Score analysis can be effective in identifying malicious patterns for a given tenant's traffic. Each module 208 tracking multi-dimensional data can implement their own anomaly scoring system utilizing the correlation among various aspects of the tracked data. A simple normalized score for top-n may be computed as:

$$N\text{: Total Entries in } TopN$$

$$r_i\text{: Rank of entity } i \text{ where } ri \in \{1, 2 \ldots , N\}$$

$$S_i\text{: Normalized score for entity } i$$

$$S_i = 1 - \frac{(r_i - 1)}{(N - 1)} \text{ for } N > 1$$

Using such normalized scores, a weighted composite score for each module is created. The higher the score, the more likely the observation is an anomaly.

$$A_i = W_{rps} \cdot \frac{RPS_{tenant}}{RPS_{total}} + W_{tenant} \cdot S_{topn.tenant} + W_{ip} \cdot S_{topn.ip}$$

Here, the aggregate anomaly score is $A_i$, $W_{rps}$ is adaptive weight for the tenant tracker security module, and $$\frac{RPS_{tenant}}{RPS_{total}}$$

is the anomaly score determined by the tenant tracker security module. Similarly, $W_{tenant} \cdot S_{topn.tenant}$ is the adaptive weight multiplied by the anomaly score determined for the top N tenants and $W_{ip} \cdot S_{topn.ip}$ is the adaptive weight multiplied by the anomaly score determined for the top N IP addresses. More or lesser number of security modules may similarly contribute to the aggregate anomaly score without deviating from the disclosure. Further, methods other than Z-Score may be employed in examples of the disclosure.

In an example, each module 208 implements multiple anomaly scoring systems. The scoring algorithm to use is dictated by the policy engine configurations (e.g., configured using the configuration manager 212). For example, each security module may be used for computing anomaly score for a particular type of traffic data and this is governed by policy configured via the configuration manager 212.

Figure 3:
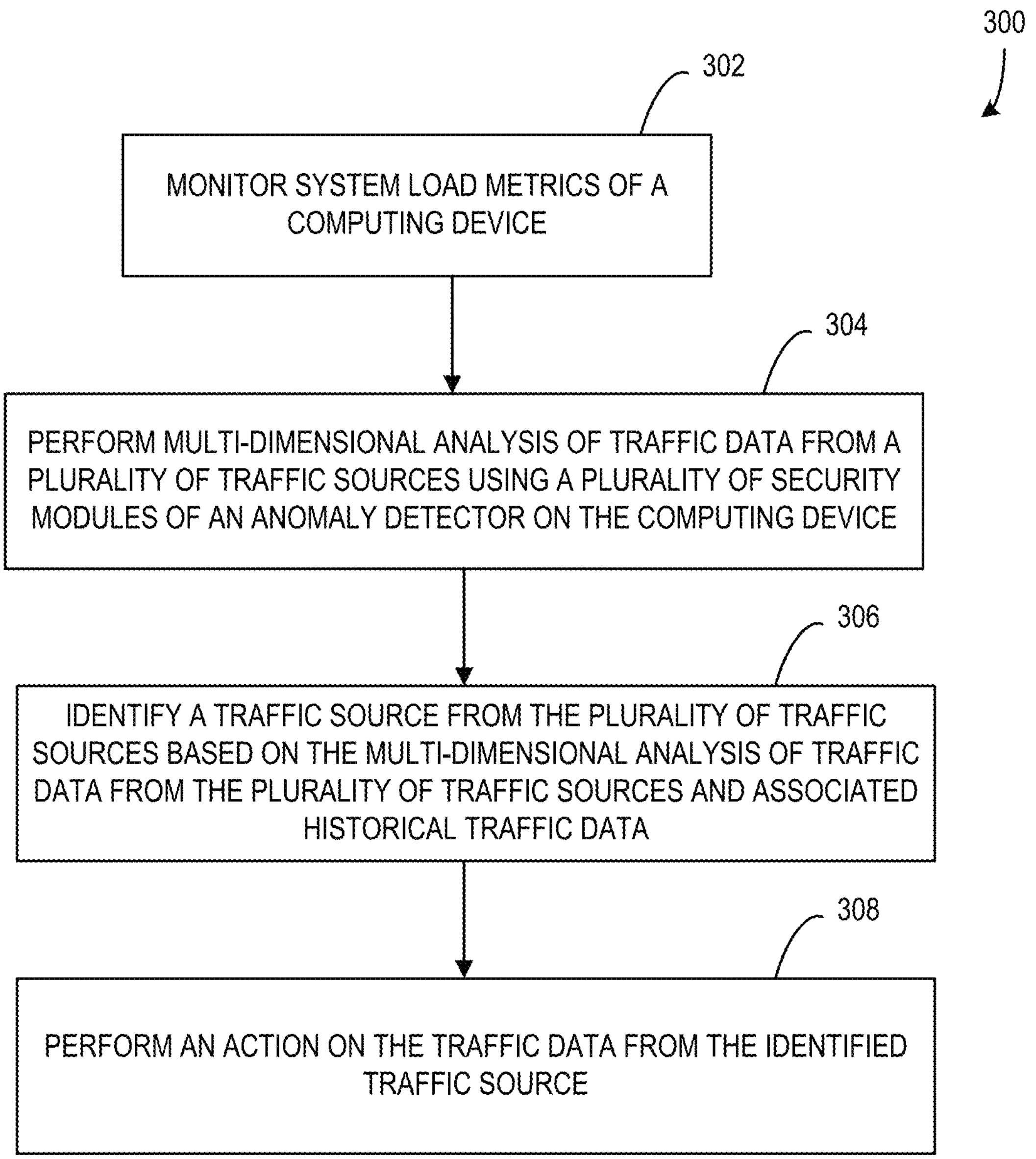
FIG. 3 is a flowchart illustrating an example method for adaptive multi-dimensional anomaly detection for DDOS defense.

FIG. 3 is a flowchart illustrating an example method 300 for adaptive multi-dimensional anomaly detection for DDOS defense. In some examples, the method 300 is executed or otherwise performed in a system such as system 100 of FIG. 1.

At 302, system load metrics of a computing device are monitored. The system load metrics of computing device comprises two or more of central processing unit (CPU), memory, network, and disk. At 304, multi-dimensional analysis of traffic data from a plurality of traffic sources is performed using a plurality of security modules of an anomaly detector on the computing device. The plurality of security modules comprises two or more of a tenant tracker, an IP address tracker, and a connection tracker. At 306, a traffic source is identified from the plurality of traffic sources based on the multi-dimensional analysis of traffic data from the plurality of traffic sources and associated historical traffic data. At 308, an action is performed on the traffic data from the identified traffic source and the traffic data from the plurality of traffic sources other than the identified traffic source is allowed. The action on the traffic data from the identified traffic source comprises blocking or throttling the traffic data from the identified traffic source for a predetermined time period (e.g., 8 hours, 1 day, permanently, etc.).

In some examples, probabilistic data structures such as count-min sketch (CMS), HyperLogLog (HLL), and exponentially weighted moving average (EWMA) are used for tracking the traffic data from the plurality of traffic sources. The use of probabilistic data structures optimizes performance and resource utilization. Unlike traditional data structures or time-series databases that offer accurate results but at the cost of linear memory growth and computational overhead, probabilistic data structures provide approximate results with significantly lower resource requirements. This trade-off is particularly beneficial in scenarios involving large-scale data or real-time processing where responsiveness and efficiency are critical compared to accuracy of the data.

Count-min sketch (CMS) may be used for estimating the frequency of each element in a data stream. In examples of the disclosure, the CMS may be used to track metrics like requests per second (RPS) from each IP address or tenant. This allows detection of anomalies in the frequency patterns, such as sudden spikes in RPS, which could indicate a potential DDOS attack. HyperLogLog (HLL) may be used for cardinality estimation e.g., providing an estimate of the number of unique elements in a dataset. In examples of the disclosure, the HILL may be used to estimate the number of unique IPs interacting with a tenant or the number of unique domains accessed by an IP. This helps in identifying unusual patterns, such as an unexpected increase in the number of unique IPs, which could signify a potential DDOS attack. The exponential weighted moving average (EWMA) is a specific type of rate estimator that gives more weight to the most recent data points. It's highly efficient in terms of both time and space complexity, making it well-suited for real-time systems that require quick updates and minimal storage overhead. In examples of the disclosure, the EWMA uses a smoothing factor to control how quickly it adapts to changes in the rate, allowing the platform protection engine 102 to capture either short-term fluctuations or longer-term trends based on specific needs.

Figure 4:
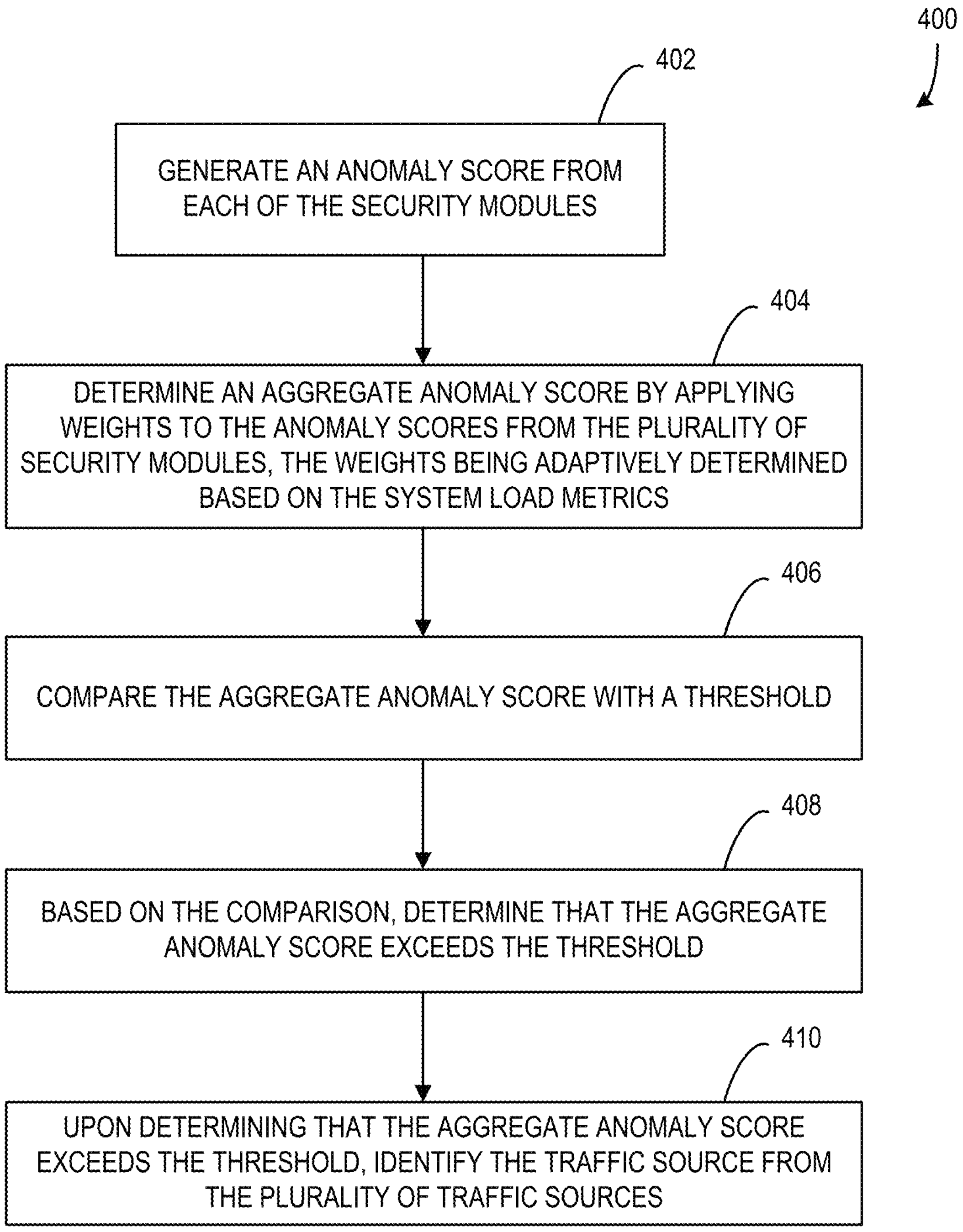
FIG. 4 is a flowchart illustrating an example method of using anomaly scores for identifying anomalous traffic source.

FIG. 4 is a flowchart illustrating an example method 400 of using anomaly scores for identifying anomalous traffic source. In some examples, the method 400 is executed or otherwise performed in a system such as system 100 of FIG. 1. At 402, an anomaly score is generated from each of the plurality of security modules 112. At 404, an aggregate anomaly score is determined by applying weights to the anomaly scores from the plurality of security modules. The weights are adaptively determined based on the system load metrics. At 406, the aggregate anomaly score is compared with a threshold. At 408 the aggregate anomaly score is determined to exceed the threshold based on comparison. At 410, the traffic source (e.g., contributing most to the aggregate anomaly score and/or based on historical traffic data) is identified from the plurality of traffic sources.

The platform protection engine 102 uses probabilistic data structures to track multiple traffic data and statistical methods to detect outliers. Using the various hooks that are exposed to the proxy, platform protection engine 102 tracks traffic data under different categories, each of these categories form their own "Protector Module" 208. Each protector module is empowered to track their own data and register for different hook points as required.

If traffic data is captured as single dimensional data by monitoring a single characteristic or metrics for each entity (like tenants, IPs, or connections) without considering the interrelations or combined behavior patterns among these entities, correlating these multiple metrics must be done to perform multi-dimensional analysis of traffic data. In some examples, traffic data may be captured as multi-dimensional traffic data by monitoring a range of metrics across different entities and analyzing them in relation to each other. The multi-dimensional traffic data provides a holistic view of the traffic behavior by considering the interdependencies and interactions between the different metrics and entities.

The multi-dimensional analysis captures complex patterns because the multi-dimensional analysis detects sophisticated attack strategies that exploit the interplay between different network entities. The multi-dimensional analysis of the disclosure provides a more nuanced view, reducing the likelihood of misidentifying normal behavior as an anomaly and vice versa. In some examples, alternatively or in addition to applying adaptive weights, the threshold may be adaptively adjusted based on system load metrics. For example, if processor is determined to be underutilized based on the system load metrics, the threshold for the system is lowered so that even small increase in processor load is advantageously identified.

Each of the security modules 112 may learn from data logged/aggregated by the data aggregator 210 from historical requests or traffic data using machine learning techniques. In some examples, the security modules 112 may be updated with the machine learned security modules resulting in an enhanced anomaly detector 110.

Additional Examples

An exemplary algorithm 500 providing adaptive multi-dimensional anomaly detection for a system such as system 100 or 200 is described in FIG. 5.

In some examples, the tenant tracker is responsible for tracking all dimensions of data relevant to a single tenant. TenantID is a value that uniquely identifies the tenant and is supplied by the proxy as a property in each request. Tenant tracker tracks the top-n tenants in a TopTalker data structure, and each tenant tracked contains the list of data shown in the structure TenantStats. These TenantStats are ordered by their RPS value in the toptalker binary heap.

An example TenantStats data structure 600 for anomaly detection using multi-dimensional traffic analysis at the tenant level is described in FIG. 6. For example, the tenant tracker finds out how the traffic data for a single server that handles 10000 RPS is divided among the unique tenants that are served by this server. An exemplary TenantStats is shown below:

```
TenantStats {
Tenant_id: bing.com,
Rps: 1000 (EWMA),
Top1000_ops: {
   1.1.1.1: 500,
   1.1.1.2: 200,
   1.1.1.3: 100,
   ...
}
Unique_ips: 25000,
Active_connections: 500,
}
```

When a request comes in from IP address 1.1.1.1 and the system is under a load, tenant tracker defines its own anomaly scoring mechanism using these attributes to come up with an anomaly score for the IP addresses, and may identify this IP address 1.1.1.1 as a bad actor or anomalous traffic source because this IP address 1.1.1.1 is historically known to generate RPS of 40-50 and RPS of 500 is unusual for this actor. The multidimensional TenantStats attributes help identify the bad actors from a tenant perspective. The anomaly detection platform 102 may identify the IP address 1.1.1.1 as a bad actor to the proxy or CDN for taking action against the identified bad actor. The action may be to block or throttle traffic data from the identified IP address 1.1.1.1 during a time period (e.g., for next 8 hours).

An example IPStats data structure 700 used by IPTracker security module is described in FIG. 7. The IPStats data structure provides detailed metrics for each IP address, offering a comprehensive view of its interaction patterns. These metrics include rates of requests and bytes per second (RPS and BPS), interaction with tenants, and the number of active connections. The metrics are designed to capture both the volume and the distribution of traffic originating from or associated with each IP. The IP tracker structure uses the TopTalkers data structure to maintain a list of top N IPs based on the tracked metrics. This focus on top IPs allows the system to quickly identify and analyze the most significant sources of traffic, which is particularly useful for detecting and mitigating potential threats or anomalies in a timely manner.

For example, a normal IP address generates 10 RPS and accesses 10 tenants. IPStats may identify a particular IP address generating 100 RPS and accessing 100s of tenants as a source of anomalous traffic. The multidimensional IPStats attributes help identify the bad actors from an IP address perspective.

An example ConnStats data structure 800 used by ConnectionTracker security module is described in FIG. 8. The ConnStats data structure provides comprehensive metrics for each connection, offering a granular view of traffic and behavior on a per-connection basis. Metrics include the volume of data transferred, connection duration, and rates of requests and bytes per second, among others. This detailed information enables understanding and evaluation of the nature of each connection. The connection tracker structure maintains a map of all active connections, allowing for quick access and analysis of each connection's statistics. Additionally, it employs the TopTalkers data structure to identify and focus on the top N connections based on transferred bytes. This prioritization efficiently detects and responds to anomalies that are most significant in terms of data volume, ensuring that the system's resources are effectively allocated.

Tenant tracker and IP tracker advantageously detect volumetric DDOS attacks while the connection tracker detects slow DDOS attacks. For example, a bad actor opens a connection and keep sending one byte every second via botnets. This may not look like too much load but if this bad actor uses botnets to open enough connections across multiple tenants, the system may run out of connections and effectively become unavailable to service even legitimate connections. The multidimensional connection attributes of the disclosure help to identify the bad actor from a connection perspective in this example. For example, anomaly scores from the tenant tracker and IP tracker do not identify this particular traffic source as a bad actor, but an anomaly score from the connection tracker is high because this traffic source is using an unusually high number of connections. The platform protection engine 102 may recommend to the proxy or the CDN to take action against this traffic source.

An example of a ConfigManager data structure 900 used to configure the parameters for anomaly detection is described in FIG. 9. A configuration manager handles the dynamic platform protection configuration that gets updated in runtime. The ConfigManager data structure exposes a function or trait that can be hooked into the platform protection engine's core event loop to receive an updated configuration. On receiving the updated configuration, the configuration manager parses it and stores it in memory. A shared configuration store is used for maintaining this configuration data in the serialized format.

Exemplary Operating Environment

Figure 10:
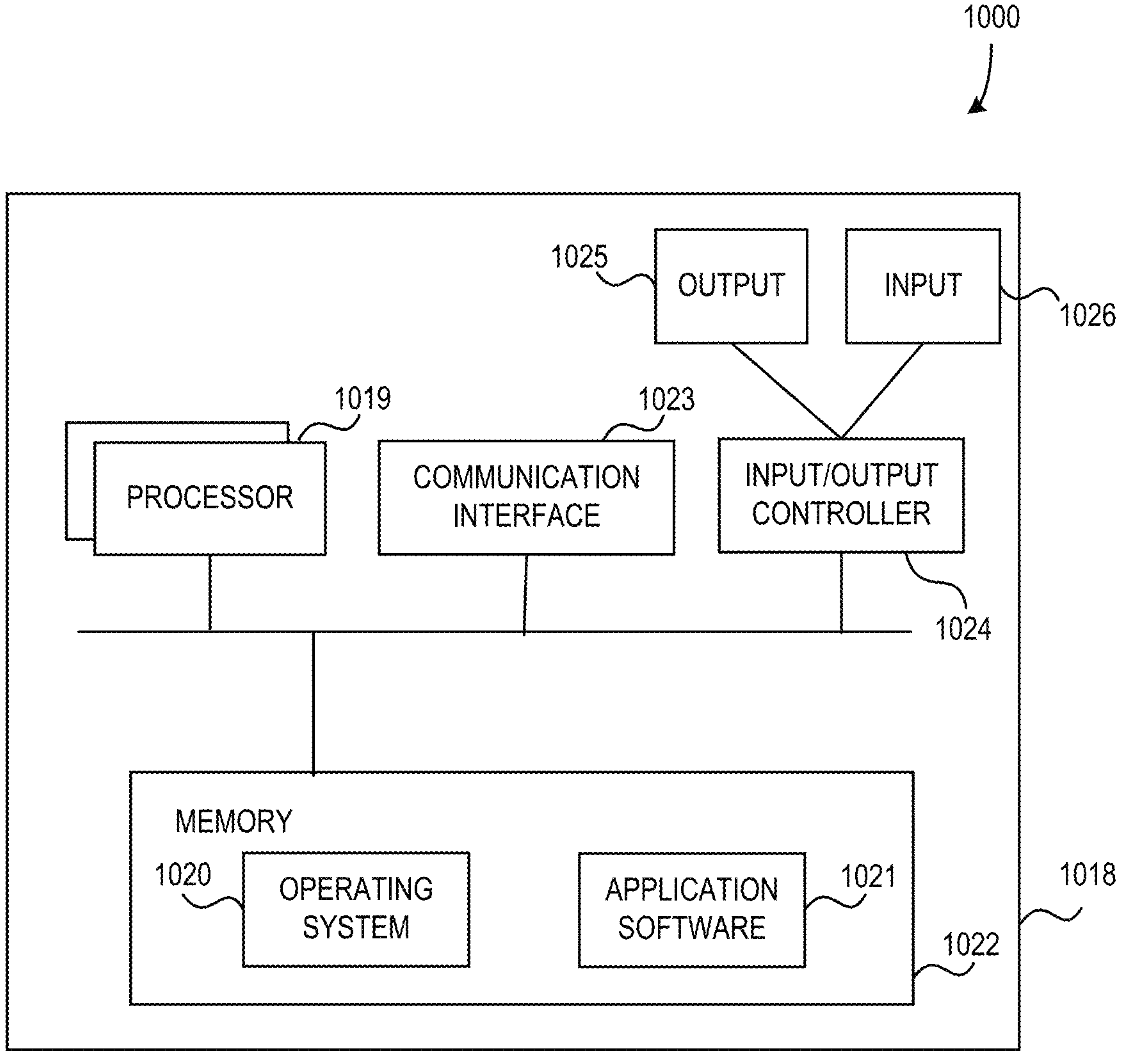
FIG. 10 illustrates an example computing apparatus as a functional block diagram.

The present disclosure is operable with a computing apparatus according to an embodiment as a functional block diagram 1000 in FIG. 10. In an example, components of a computing apparatus 1018 are implemented as a part of an electronic device according to one or more embodiments described in this specification. The computing apparatus 1018 comprises one or more processors 1019 which may be microprocessors, controllers, or any other suitable type of processors for processing computer executable instructions to control the operation of the electronic device. Alternatively, or in addition, the processor 1019 is any technology capable of executing logic or instructions, such as a hard-coded machine. In some examples, platform software comprising an operating system 1020 or any other suitable platform software is provided on the apparatus 1018 to enable application software 1021 to be executed on the device. In some examples, adaptive multi-dimensional anomaly detection as described herein is accomplished by software, hardware, and/or firmware.

In some examples, computer executable instructions are provided using any computer-readable media that is accessible by the computing apparatus 1018. Computer-readable media include, for example, computer storage media such as a memory 1022 and communications media. Computer storage media, such as a memory 1022, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium is not a propagating signal. Propagated signals are not examples of computer storage media. Although the computer storage medium (the memory 1022) is shown within the computing apparatus 1018, it will be appreciated by a person skilled in the art, that, in some examples, the storage is distributed or located remotely and accessed via a network or other communication link (e.g., using a communication interface 1023).

Further, in some examples, the computing apparatus 1018 comprises an input/output controller 1024 configured to output information to one or more output devices 1025, for example a display or a speaker, which are separate from or integral to the electronic device. Additionally, or alternatively, the input/output controller 1024 is configured to receive and process an input from one or more input devices 1026, for example, a keyboard, a microphone, or a touchpad. In one example, the output device 1025 also acts as the input device. An example of such a device is a touch sensitive display. The input/output controller 1024 may also output data to devices other than the output device, e.g., a locally connected printing device. In some examples, a user provides input to the input device(s) 1026 and/or receives output from the output device(s) 1025.

The functionality described herein can be performed, at least in part, by one or more hardware logic components. According to an embodiment, the computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for distributed denial-of-service (DDoS) protection comprises: a processor; and a memory storing instructions that upon execution by the processor perform operations comprising: monitoring system load metrics of a computing device; using the system load metrics, performing multi-dimensional analysis of traffic data from a plurality of traffic sources with security modules of an anomaly detector on the computing device, wherein performing the multi-dimensional analysis comprises generating an aggregated anomaly score from the security modules using adaptive weighting; identifying a traffic source from the plurality of traffic sources based on the multi-dimensional analysis of traffic data from the plurality of traffic sources and associated historical traffic data; and blocking the traffic data from the identified traffic source and allowing the traffic data from the plurality of traffic sources other than the identified traffic source.

An example computerized method comprises monitoring system load metrics of a computing device; using the system load metrics, performing multi-dimensional analysis of traffic data from a plurality of traffic sources with an anomaly detector on the computing device; identifying a traffic source from the plurality of traffic sources based on the multi-dimensional analysis and associated historical traffic data; and performing an action only on the traffic data from the identified traffic source.

An example computer storage medium stores computer-executable instructions that, upon execution by a processor, cause the processor to perform operations comprising: monitoring system load metrics of a computing device; using the system load metrics, performing multi-dimensional analysis of traffic data from a plurality of traffic sources with an anomaly detector on the computing device; identifying a traffic source from the plurality of traffic sources based on the multi-dimensional analysis of traffic data from the plurality of traffic sources and associated historical traffic data; and performing an action on the traffic data from the identified traffic source without performing the action on the traffic data from the plurality of traffic sources other than the identified traffic source.

Alternatively, or in addition to the other examples described herein, examples include any combination of the following:

- wherein performing the multi-dimensional analysis of traffic data comprises analyzing the traffic data from each of the plurality of traffic sources on a range of metrics across different entities and on interrelationships among the range of metrics across different entities.
- generating an anomaly score from each of the security modules;
- determining the aggregate anomaly score by applying weights to the anomaly scores from the security modules, the weights being adaptively determined based on the system load metrics;
- comparing the aggregate anomaly score with a threshold;
- based on the comparison, determining that the aggregate anomaly score exceeds the threshold; and
- identifying the traffic source from the plurality of traffic sources.
- wherein the system load metrics comprises two or more of: central processing unit (CPU), memory, network, or disk.
- wherein the security modules comprise two or more of: a tenant tracker, an internet protocol (IP) address tracker, or a connection tracker.
- wherein blocking the traffic data from the identified traffic source comprises blocking only for a time period.
- using a probabilistic data structure for tracking the traffic data from the plurality of traffic sources, the probabilistic data structure comprising one or more of: count-min sketch (CMS), HyperLogLog (HLL), or exponentially weighted moving average (EWMA).
- obtaining a first anomaly score from a first security module and a second anomaly score from a second security module, the first security module and the second security module being associated with the anomaly detector; adaptively determining a first weight and a second weight based on the system load metrics; applying the first weight to the first anomaly score and the second weight to the second anomaly score; generating an aggregate anomaly score using the weighted first anomaly score and the weighted second anomaly score; comparing the aggregate anomaly score with a threshold; based on the comparison, determining that the aggregate anomaly score exceeds the threshold; and identifying the traffic source from the plurality of traffic sources.
- wherein the action on the traffic data from the identified traffic source comprises blocking or throttling the traffic data from the identified traffic source during a time period.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for monitoring a plurality of system load metrics of a computing device; exemplary means for performing multi-dimensional analysis of traffic data from a plurality of traffic sources using a plurality of security modules of an anomaly detector on the computing device; exemplary means for identifying a traffic source from the plurality of traffic sources based on the multi-dimensional analysis of traffic data from the plurality of traffic sources and associated historical traffic data; and exemplary means for performing an action on the traffic data from the identified traffic source and allowing the traffic data from the plurality of traffic sources other than the identified traffic source.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for distributed denial-of-service (DDoS) protection, the system comprising:

a processor; and a memory storing instructions that upon execution by the processor perform operations comprising:

monitoring system load metrics of a computing device;

using the system load metrics, performing multi-dimensional analysis of traffic data from a plurality of traffic sources with security modules of an anomaly detector on the computing device, wherein performing the multi-dimensional analysis comprises generating an aggregate anomaly score from the security modules using adaptive weighting based on the system load metrics to dynamically adjust influence of individual anomaly scores from the security modules, wherein the adaptive weighting increases a weight applied to a first anomaly score from a first security module relative to weights applied to anomaly scores from remaining security modules based on a system load metric indicating exhaustion of a resource type associated with the first security module;

identifying a traffic source from the plurality of traffic sources that contributes most to the aggregate anomaly score based on the multi-dimensional analysis of traffic data from the plurality of traffic sources and associated historical traffic data of the plurality of traffic sources; and blocking the traffic data from the identified traffic source and allowing the traffic data from the plurality of traffic sources other than the identified traffic source.

2. The system of claim 1, wherein performing the multi-dimensional analysis of traffic data comprises analyzing the traffic data from each of the plurality of traffic sources on a range of metrics across different entities and on interrelationships among the range of metrics across different entities.

3. The system of claim 1, wherein the instructions upon execution by the processor perform further operations comprising:

generating an anomaly score from each of the security modules;

determining the aggregate anomaly score by applying weights to the anomaly scores from the security modules, the weights being adaptively determined based on the system load metrics;

comparing the aggregate anomaly score with a threshold;

based on the comparison, determining that the aggregate anomaly score exceeds the threshold; and identifying the traffic source from the plurality of traffic sources.

4. The system of claim 1, wherein the system load metrics comprises central processing unit (CPU), memory, network, and disk.

5. The system of claim 4, wherein the security modules comprise two or more of: a tenant tracker, an internet protocol (IP) address tracker, or a connection tracker, wherein the instructions upon execution by the processor perform further operations comprising:

increasing weights to the anomaly scores from the tenant tracker and the IP address tracker relative to a weight to the anomaly score from the connection tracker in response to determining exhaustion of the CPU; and increasing the weight to the anomaly score from the connection tracker relative to the weights to the anomaly scores from the tenant tracker and the IP address tracker in response to determining exhaustion of the memory.

6. The system of claim 1, wherein blocking the traffic data from the identified traffic source comprises blocking only for a time period.

7. The system of claim 1, wherein the instructions upon execution by the processor perform further operations comprising:

using a probabilistic data structure for tracking the traffic data from the plurality of traffic sources, the probabilistic data structure comprising one or more of: count-min sketch (CMS), HyperLogLog (HLL), or exponentially weighted moving average (EWMA).

8. A computerized method comprising:

monitoring system load metrics of a computing device;

using the system load metrics, performing multi-dimensional analysis of traffic data from a plurality of traffic sources with an anomaly detector on the computing device, wherein performing the multi-dimensional analysis comprises generating anomaly scores from security modules of the anomaly detector and determining an aggregate anomaly score by applying adaptive weights to the anomaly scores based on the system load metrics, wherein applying the adaptive weights comprises adaptively increasing a weight applied to a first anomaly score from a first security module relative to weights applied to anomaly scores from remaining security modules based on a system load metric indicating exhaustion of a resource type associated with the first security module;

identifying a traffic source from the plurality of traffic sources that contributes most to the aggregate anomaly score based on the multi-dimensional analysis and associated historical traffic data of the plurality of traffic sources; and performing an action only on the traffic data from the identified traffic source.

9. The computerized method of claim 8, wherein performing the multi-dimensional analysis of traffic data comprises analyzing the traffic data from each of the plurality of traffic sources on a range of metrics across different entities and on interrelationships among the range of metrics across different entities.

10. The computerized method of claim 8, further comprising:

obtaining the first anomaly score from the first security module and a second anomaly score from a second security module, the first security module and the second security module being associated with the anomaly detector;

adaptively determining a first weight and a second weight based on the system load metrics;

applying the first weight to the first anomaly score and the second weight to the second anomaly score;

generating the aggregate anomaly score using the weighted first anomaly score and the weighted second anomaly score;

comparing the aggregate anomaly score with a threshold;

based on the comparison, determining that the aggregate anomaly score exceeds the threshold; and identifying the traffic source from the plurality of traffic sources.

11. The computerized method of claim 8, wherein the system load metrics of the computing device comprises two or more of: central processing unit (CPU), memory, network, or disk.

12. The computerized method of claim 8, wherein the anomaly detector comprises two or more of: a tenant tracker, an internet protocol (IP) address tracker, or a connection tracker.

13. The computerized method of claim 8, wherein the action on the traffic data from the identified traffic source comprises blocking or throttling the traffic data from the identified traffic source during a time period.

14. The computerized method of claim 8, further comprising using a probabilistic data structure for tracking the traffic data from the plurality of traffic sources, the probabilistic data structure comprising one or more of: count-min sketch (CMS), HyperLogLog (HLL), or exponentially weighted moving average (EWMA).

15. A computer storage medium storing computer-executable instructions that, upon execution by a processor, cause the processor to perform operations comprising:

monitoring system load metrics of a computing device;

using the system load metrics, performing multi-dimensional analysis of traffic data from a plurality of traffic sources with an anomaly detector on the computing device, wherein performing the multi-dimensional analysis comprises generating anomaly scores from security modules of the anomaly detector and determining an aggregate anomaly score by applying adaptive weights to the anomaly scores based on the system load metrics, wherein applying the adaptive weights comprises adaptively increasing a weight applied to a first anomaly score from a first security module relative to weights applied to anomaly scores from remaining security modules based on a system load metric indicating exhaustion of a resource type associated with the first security module;

identifying a traffic source from the plurality of traffic sources based on the multi-dimensional analysis of traffic data from the plurality of traffic sources and associated historical traffic data of the plurality of traffic sources; and performing an action on the traffic data from the identified traffic source without performing the action on the traffic data from the plurality of traffic sources other than the identified traffic source.

16. The computer storage medium of claim 15, wherein performing the multi-dimensional analysis of traffic data comprises analyzing the traffic data from each of the plurality of traffic sources on a range of metrics across different entities and on interrelationships among the range of metrics across different entities.

17. The computer storage medium of claim 15, wherein the computer-executable instructions, upon execution by the processor, cause the processor to perform operations comprising:

obtaining the first anomaly score from the first security module and a second anomaly score from a second security module, the first security module and the second security module being associated with the anomaly detector;

adaptively determining a first weight and a second weight based on the system load metrics;

applying the first weight to the first anomaly score and the second weight to the second anomaly score;

generating the aggregate anomaly score using the weighted first anomaly score and the weighted second anomaly score;

comparing the aggregate anomaly score with a threshold;

based on the comparison, determining that the aggregate anomaly score exceeds the threshold; and identifying the traffic source from the plurality of traffic sources.

18. The computer storage medium of claim 15, wherein the system load metrics comprise two or more of: central processing unit (CPU), memory, network, or disk.

19. The computer storage medium of claim 15, wherein the anomaly detector comprises two or more of: a tenant tracker, an internet protocol (IP) address tracker, or a connection tracker.

20. The computer storage medium of claim 15, wherein the action on the traffic data from the identified traffic source comprises blocking or throttling the traffic data from the identified traffic source during a time period.

* * * * *